June 24, 1952 J. H. HAMMOND, JR 2,601,393
SELECTIVE REMOTE CONTROL SYSTEM
Filed May 27, 1948
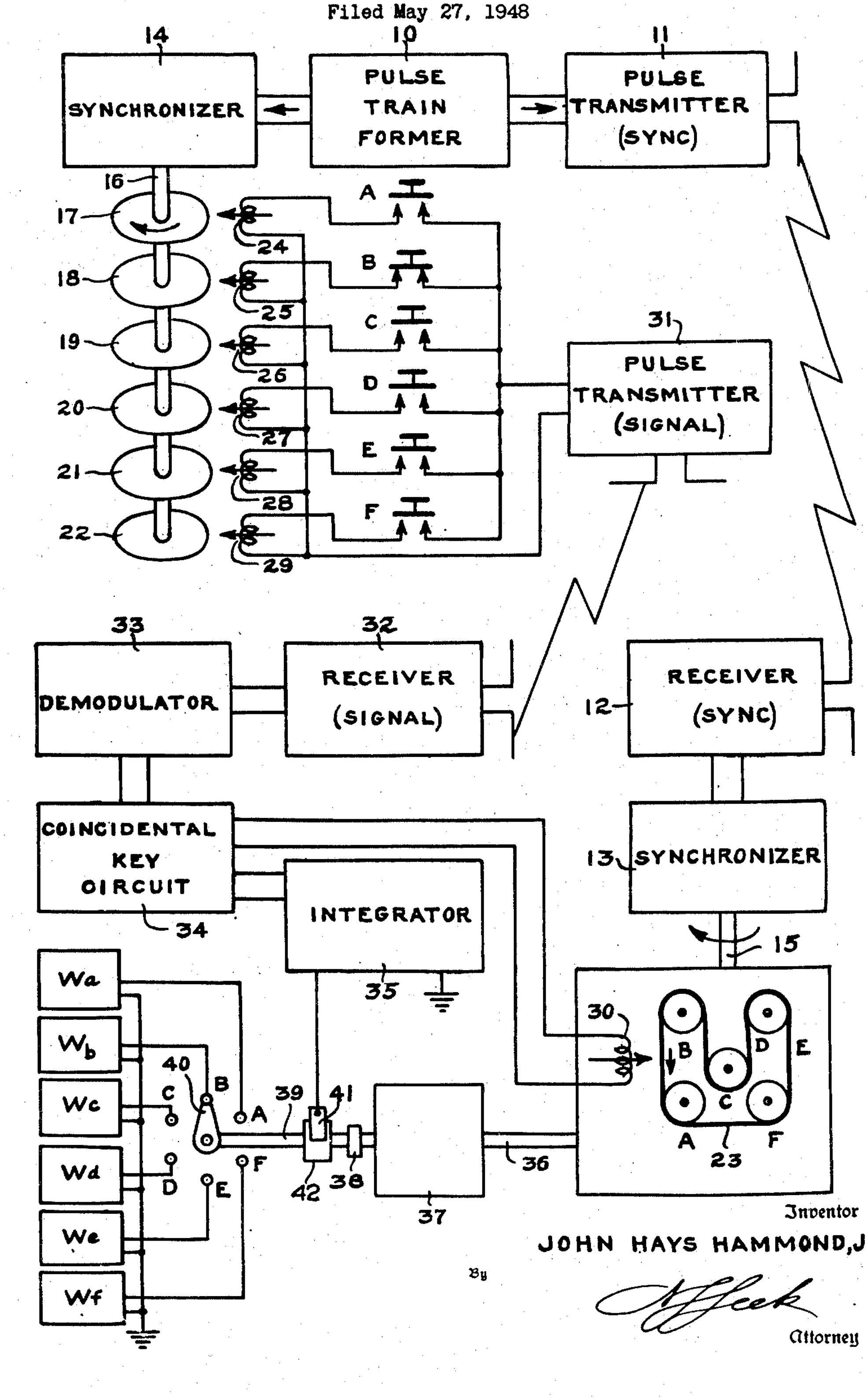
Inventor
JOHN HAYS HAMMOND, JR.
By
Attorney Patented June 24, 1952 2,601,393

UNITED STATES PATENT OFFICE 2,601,393

SELECTIVE REMOTE CONTROL SYSTEM

John Hays Hammond, Jr., Gloucester, Mass.

Application May 27, 1948, Serial No. 29,530

3 Claims. (Cl. 177—353)

This invention relates to an electro-mechanical remote control system and more particularly to a system wherein the control is effected by matching a pulse pattern at the transmitter and receiver.

In a copending application filed of even date herewith, Serial No. 29,528, now U. S. Patent No. 2,583,373, issued January 22, 1952, I have shown a control system in which control was exercised by use of two trains of recurrent pulses, with a fixed time interval between the pulses of each train, one train being used to drive a synchronous receiver mechanism and the other being used to actuate a photo lamp, with selective control in accordance with the position of the mechanism at the time of flashing the lamp.

My present invention relates to a control system using two trains of pulses, one for synchronizing a receiver mechanism but with the other a signal train for comparison with a train of pulses recorded on a moving member of the receiver mechanism. The individual pulses of the signal train are not necessarily evenly spaced or of uniform length, but may have a random type of pattern. The system provides for security of control and simplicity of construction.

In one embodiment two radio links are provided between the control push buttons and the work circuits to be actuated in accordance with the control button used. One radio link provides synchronous operation of transmitter and receiver mechanism while the other radio link provides for transmission of a pulse train characteristic of the operation desired, which is compared with a pulse train synchronously supplied locally at the receiver. If the individual pulses of the transmitted and locally supplied pulse trains match in timing, the desired control will be consummated. If there is no match the receiver continues to release other pulse trains for comparison purposes until the desired pattern presented by the transmitter is matched at the receiver. Thus the receiver is constantly seeking a control signal from the transmitter and responding when one is being sent. This method has the advantage that the number of electronic circuits is minimized, but it requires that the transmitted signal be sent for a sufficiently long period of time so that the receiver will have an opportunity to present the correct locally produced train for comparison. An alternate method may employ a multiplicity of electronic circuits to each of which all the possible locally produced trains are presented simultaneously instead of in succession. Other modifications are possible but the invention will be understood from the following description, taken in connection with the accompanying drawing, in which one embodiment has been set forth for purposes of illustration.

In the drawing, the figure is a schematic diagram illustrating one embodiment of the invention.

Referring to the drawing more in detail, the pulse train for synchronizing the transmitter and receiver mechanisms is generated in pulse train former 10 which may generate for example three equally spaced pulses or any selective pattern for accurately triggering a synchronizer mechanism. The pulse train former 10 may be of the known type used in television transmitters for producing synchronizing pulses. The output of the pulse train former is connected to a standard radar type pulse transmitter 11 which is connected by the intervening medium to the receiver 12 to recreate the synchronizing pulse train in the input to synchronizer 13. The output of the pulse train former 10 is also connected to a synchronizer 14. These two devices 13 and 14 may be of the same general nature to turn a receiver shaft 15 in step with a transmitter shaft 16 so that they have the same angular positions at all times. One type of pulse former and synchronizer for a mechanically driven member is shown in Hammond Patent No. 1,874,287, dated August 30, 1932. The shaft 16 carries a plurality of records 17 to 22 such as six magnetic blanks on which are recorded different pulse train patterns. The shaft 15 drives an endless record such as a magnetic tape or wire on which are recorded in succession all six of the records driven by shaft 16. The shaft 15 is so geared that any point of the receiver record 23 moves around the path during six revolutions of the transmitter shaft 16. Pickups 24 to 29 are provided for the transmitter records and pick up 30 for the receiver record, and adjustments may be made in the synchronizing system so a voltage pulse is produced by the pickup 30 at the same time a voltage pulse is produced by one of the pickups at the transmitter, due allowance being made for the time required for transmission of radio signals. That is, the pulse pattern produced by the receiver record 23 in the windings of pickup 30 may be identical with the pulse patterns produced by the transmitter records 17 to 22 in succession in the corresponding pickups 24 to 29. It will be understood that the discs 17 to 22 may have been used as master records by which the receiver record 23 has been made up by successive recordings.

The pickups 24 to 29 all have one terminal connected to a contact of a corresponding push button, designated A to F for pickups 24 to 29 respectively. The other contacts of these buttons are connected together and to an input terminal of a pulse type transmitter 31. The other terminals of the pickups are connected together and to the other input terminal of the transmitter 31. When one of the buttons, say B is closed as here shown, the transmitter 31 will be pulsed in accordance with the voltage pattern produced by the corresponding pickup, such as pickup 25 for button B. This button should be held closed at least for more than six revolutions of the shaft 16 to give an opportunity for the receiver record 23 to match in its movement a train of pulses produced by pickup 25 by a like train of pulses produced by pickup 30. The pulse train corresponding to the selected transmitter pickup is selectively transmitted from transmitter 31 to a receiver 32, and is recreated by demodulator 33 to correspond to the pulse train produced by the selected transmitter pickup. It will be understood that the synchronizing pulses and the signal pulses are transmitted to their respective receivers 12 and 32 over different radio channels, so there is no confusion in diverting the desired pulses to the desired circuits of the receiver.

The pulse trains from the demodulator 33 and from the local record pickup 30 are impressed upon the two inputs of a coincidental key circuit 34 of well known construction, so designed that it produces an output pulse during the instants when pulses are simultaneously applied to the two inputs, but produces no such output pulse when only one input pulse is present. Thus output pulses will be produced when the transmitted pulse train matches in timing the pulse train being picked up from the local record. In general the pulse patterns of the various transmitter records and corresponding portions of the receiver records will not be of a constant interval type and moreover the time between pulses will be in general much greater than the duration of a pulse. Therefore the output of the coincidental key circuit will be strong only when the part of the receiver record being reproduced corresponds to the transmitted pulse pattern. This provides for selection of the pulse pattern and identification of the control operation desired.

The output of the coincidental circuit 34 is impressed upon an integrator or totalizer circuit 35 which produces a D. C. output in accordance with the time average of the output energy of the coincidental circuit. For applying the D. C. output to the proper work circuit, the shaft 15 which drives the receiver record also may operate through shaft 36, and intermittent mechanism 37, insulating coupling 38 and shaft 39 to drive a distributor arm 40 with six contacts each connected to one terminal of two terminal work circuits W*a* to W*f*, the other ends of which are connected to ground. One terminal of the integrator 35 is connected through a brush 41 and slip ring 42 and shaft 39 to the distributor arm 40; the other terminal of integrator 35 is connected to ground. The arrangement is such that the output of integrator 35 is connected through the distributor to a work circuit corresponding to the pulse pattern released from the record 30, which matches the pulse pattern which may be released at the transmitter by use of a push button desired to operate that work circuit. In the present instance, the button B is depressed calling for operation of work circuit W*b*. The pickup 30 has been producing a pulse train from the part of the record which is identical with that being picked up by pickup 24, but the coincidental circuits were not then effectively operated because of the mismatch of the two trains of pulses. Therefore work circuit W*a* was not energized when the distributor connected the integrator 35 to the work circuit W*a*. But now the pickup 30 is producing a pulse train corresponding to the pulse train which is being transmitted over the signal channel due to closure of button B, there is a match of the two trains at the inputs of the coincidental key circuit 34, and sufficient D. C. output is produced by the integrator 35 to actuate the work circuit W*b* to which the integrator is now connected.

It will be understood that with suitable design of the transmitters to take a sufficient number of pulses, it is possible to depress two or more control buttons such as B and D, causing operation of work circuits such as W*b* and W*d* during the receiver cycle. This provides in effect for multiple control. Further it will be understood that the receiver may utilize six records, six work circuits, six coincidental keyers and six integrators if it is necessary to cut down the time that a push button should be closed without charging the nature of the pulse trains. It will be further understood that the work circuits can include timing circuits rendering them operative for a longer period than that corresponding to the operation of the coincidental key circuit.

This system is suitable for various selection and control systems such as the control of the various elements of a radio relay station, a teletyping system, receiver tuning or selection, control of moving objects or in general any system requiring selection and actuation of a large number of work circuits.

Various other modifications are possible as will be apparent to a person skilled in the art.

What is claimed is:

1. A control system comprising a plurality of sources of trains of pulses, each having a differently characterized time pattern means connecting one or more of said sources to actuate a transmitter, a receiver including a plurality of local sources of respective pulse trains matching the pulse patterns of the various transmitter actuating pulse trains, transmitter-receiver synchronizing means for releasing the pulse patterns of said trains from the local sources in sequence simultaneously with the arrival of corresponding pulse patterns from the transmitter, and receiver operated work circuits actuated in response to the time coincidence of the pulses of the transmitted trains and the pulses of the locally released pulse trains, the work circuit corresponding to a transmitted train being actuated only when the local pulse train being released matches the transmitted pulse train.

2. A remote control system as set forth in claim 1 in which the transmitter is adapted to radiate a repeated pulse pattern, said local source generates the various pulse patterns in sequence, a plurality of work circuits are connected at the receiver in sequence corresponding to the generated pulse patterns, and means responsive to a matching of the received and local pulse patterns actuates the work circuit connected at that instant.

3. A remote control system as set forth in claim 2 in which the local generating means comprises a continuous recording and a switch device in synchronism with said recording connects the various work circuits to the receiver in sequence.

JOHN HAYS HAMMOND, Jr.

REFERENCES CITED

The following references are of record in the file of this patent:

UNITED STATES PATENTS

| Number | Name | Date |
|---|---|---|
| 463,852 | Bradley | Nov. 24, 1891 |
| 1,193,807 | Lyons | Aug. 8, 1916 |
| 1,915,993 | Handel | June 27, 1933 |
| 2,256,487 | Moseley | Sept. 23, 1941 |
| 2,369,783 | Homrighous | Feb. 20, 1945 |
| 2,489,638 | Handschin | Nov. 29, 1949 |
| 2,497,936 | Finch | Feb. 21, 1950 |